United States Patent [19]

Ross

[11] Patent Number: 4,473,889
[45] Date of Patent: Sep. 25, 1984

[54] REMOTE CORRELATION OF SEQUENCE OF EVENTS

[75] Inventor: Charles W. Ross, Lansdale, Pa.

[73] Assignee: Leeds & Northrup Company, North Wales, Pa.

[21] Appl. No.: 301,350

[22] Filed: Sep. 11, 1981

[51] Int. Cl.³ .............................................. G06F 15/46
[52] U.S. Cl. .................................................... 364/900
[58] Field of Search ... 364/200 MS File, 900 MS File; 179/2 AM, 2 TC; 371/47

[56] References Cited

U.S. PATENT DOCUMENTS

| | | | |
|---|---|---|---|
| 3,810,101 | 5/1974 | Avery | 364/200 |
| 3,971,920 | 7/1976 | Johnson | 364/900 X |
| 4,117,661 | 10/1978 | Bryant, Jr. | 340/825.26 X |
| 4,332,980 | 6/1982 | Reynolds | 179/2 AM X |

Primary Examiner—Raulfe B. Zache
Attorney, Agent, or Firm—William G. Miller, Jr.; Harold Huberfeld

[57] ABSTRACT

A method for correlating in a digital data acquisition system the time sequence of a group of events at locations remote from the master station. The method corrects the time tags on the events record for the signal transmission time between the master and remote stations and also takes into account the turnaround time at the remote station. In addition, compensation is made for the drift of the remote clocks with reference to the master clock.

2 Claims, 7 Drawing Figures

REMOTE CORRELATION OF SEQUENCE OF EVENTS

BACKGROUND OF THE INVENTION

This invention relates to process monitoring and control by means of a stored program, digital data acquisition and control systems which utilize a master station and a number of remote stations. More particularly, this invention relates to a method and apparatus for ordering the time sequence in which the events at various remote locations occur when there are no synchronized clocks available at the remote stations for accurately time tagging the events in accordance with one time frame.

In the past, the correlation of the time sequence of a number of events at remote stations has required that each of the remote units recording events have a precision clock that is either synchronized with a time standard as by receiving WWVB or is periodically resynchronized to a master time signal. In such systems the correlation accuracy was, of course, based on the drift of the remote clocks since the last resynchronization.

Since the most important aspect of the problem is the accuracy of the overall sequence of events and not the exact time of the day when the events occurred, it is desirable to eliminate the expense and complexity of precision clocks at each remote unit while maintaining high overall accuracy. Thus, it is desirable to use a medium accuracy clock in a way which will minimize the error in time sequential ordering by compensating for clock drift.

SUMMARY OF THE INVENTION

In accordance with this invention a plurality of events whose time of occurrence is recorded at a remote station is correlated at a master station by a method including the steps of:

transmitting an interrogatory message from the master to the remote;

storing at the master station the master clock time, $Tm(O)$, when the end of the interrogatory message is sent;

determining at the interrogated remote station the remote clock time, $Tr(X)$, when the end of the interrogatory message was received at the remote station;

producing a reply message incorporating the time tagged event information requested, the delay time (TPTM), associated with the formation and sending of the reply message and the stored time, $Tr(X)$;

storing at the master station the master clock time, $Tm(Y)$, when the end of the reply message is received at the master station; and calculating at the master a time correction factor $TCF(n)$ for the nth sample for each event, said calculation being in accordance with the following equation:

$$TCF(n) = \tfrac{1}{2}[Tm(O)(n) + Tm(Y)(n) - TPTM - M] - TrX(n)$$

where M is the length of the message;

calculating the time correction factor, $TCF'$, with correction for the drift of the clock in the remote as compared with the master clock in accordance with the equation, $$TCF' = TCF(n) - DR(n)'[Tr(X)(n) - Tr(E)]$$

where $Tr(E)$ is the time of occurrence, $DR(n)'$ is calculated in accordance with the equation, $$DR(n)' = DR(n-1)' + W[DR(n) - DR(n-1)]$$

where W is a weighting factor and $DR(n)$ is calculated in accordance with the equation $$DR(n) = \frac{TCF(n) - TCF(n-1)}{Tr(X)(n) - Tr(X)(n-1)}$$

DESCRIPTION OF THE PREFERRED EMBODIMENT

Figure 1:
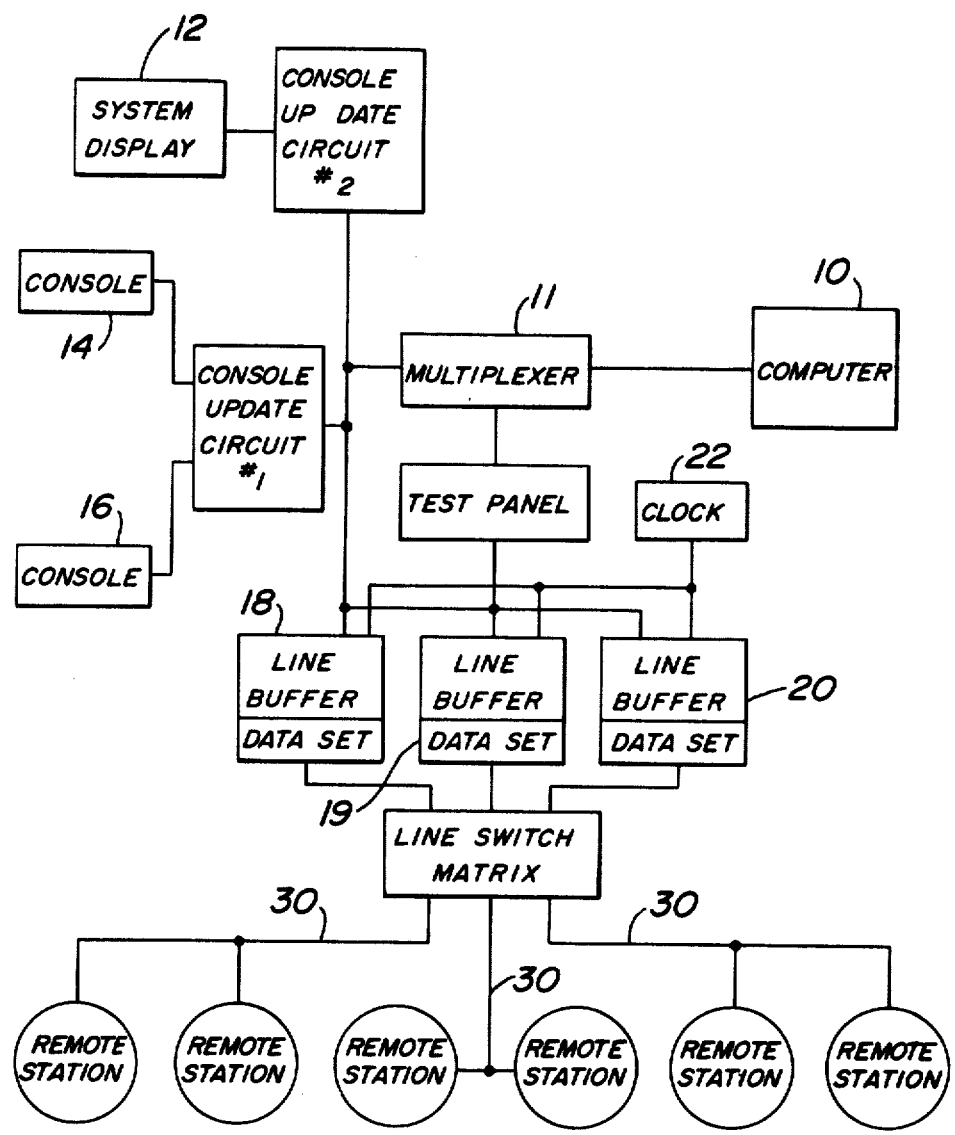
FIG. 1 is a block diagram showing a master station and a number of remote stations.

FIG. 1 shows, by way of example, a basic configuration for a digital data acquisition and control system for monitoring and controlling a process in which the master station continuously scans a number of remote stations in a supervisory mode. The master station under the direction of its computer 10 in combination with multiplexer 11 may be telemetering data to the remote stations, examining the status of various operating devices, or checking for alarm conditions. The telemetered information, upon processing by the console update circuits #1 and #2, may be processed for display as on the system display 12 and operating consoles 14 and 16.

Information may be simultaneously gathered from several remote stations by the master station through the line buffers 18, 19, and 20. Those buffers operate asynchronously under the control of computer 10. Once loaded with instructions, each line buffer operates independently at a speed compatible with the communication facility in use to interrogate a remote station and transfer data from that portion of the process serviced by the remote station.

A common master station clock 22 provides the necessary timing for the master station.

Figure 2:
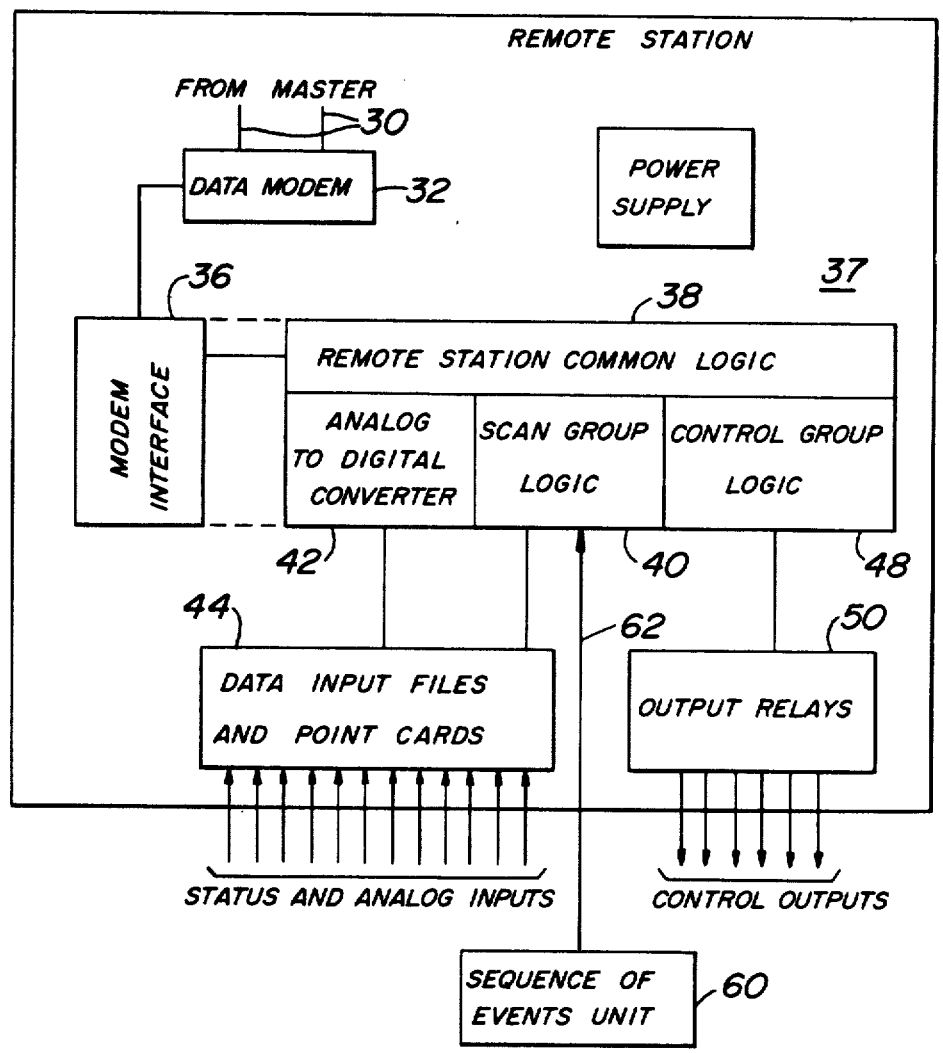
FIG. 2 is a block diagram of a remote station.

In FIG. 2 the elements of a remote station are shown with communications lines 30 connecting the remote station modem 32 to the master station. The signals from the master station may be for the purpose of initiating control of certain variables of the process or for the purposes of scanning data related to the process.

In the data scanning mode of operation, the master station has complete control of the remote station in that it selects the data to be scanned and how frequently it is to be scanned.

The master station initiates a data scan by sending an interrogation message over the communications lines 30 to a specific remote station in accordance with the station address in the message block.

The remote station goes into a data scan mode upon receipt of a valid scan interrogation from the master station. The data modem 32 receives the interrogatory message and through the modem interface 36 passes the message along to the logical elements 37 of the station, where the message is decoded. Those logic elements include logical elements 38 which are common to the station functions, the scan group logic 40, the control group logic 48, and the analog to digital converter 42. These elements are then effective to perform their logic functions in accordance with the content of the interrogatory message.

As shown by FIG. 2, the status inputs and analog inputs are operative through the data files and point cards as represented by block 44 to provide data through the analog to digital converter 42 and to work with the scan logic 40 for appropriate selection of the inputs.

While not discussed herein, since it is not involved in carrying out this invention, the control outputs of the remote station are produced by the control group logic 48 as it operates on the control relays 50.

In scanning status inputs, it may be desirable to determine the time sequence of the events being monitored. For this purpose, a "sequence of events" unit 60 is connected by line 62 to exchange control signals and data with the common logic of the remote station.

Figure 3:
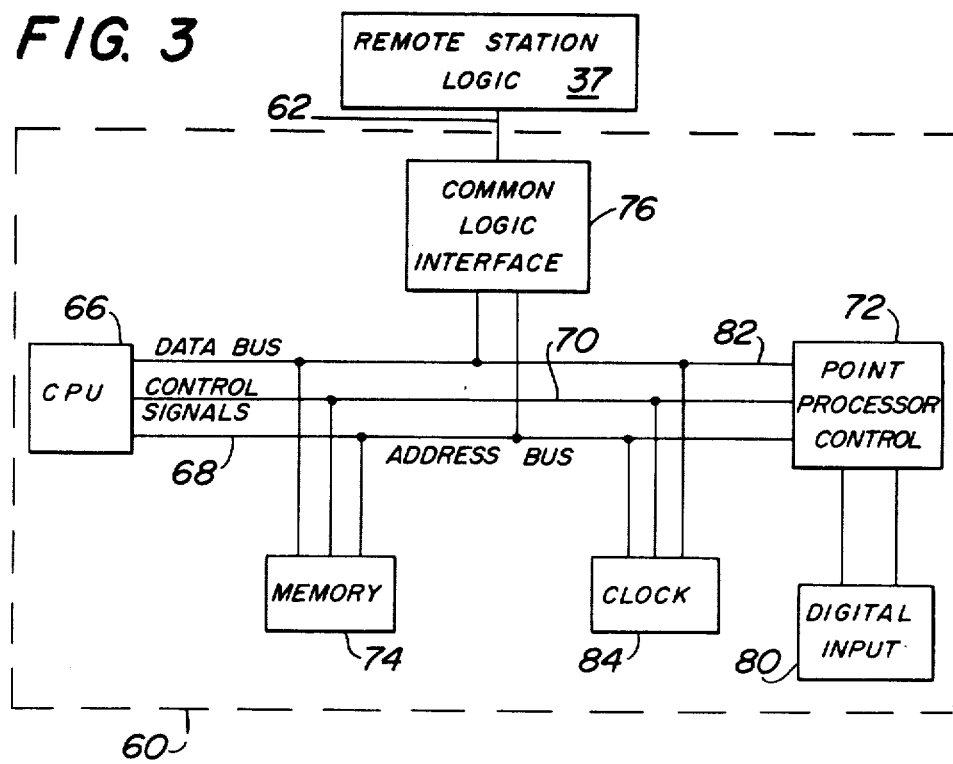
FIG. 3 is a block diagram showing a sequence of events unit.

A more detailed diagram of the sequence of events unit is shown in FIG. 3. It operates under control of the central processing unit (CPU) 66 which through the address bus 68 and the system control signals over the control signal lines 70 to direct the point processing activity by point processor 72 and the storage of point data in the memory 74. The CPU also directs the assembly and transmission of data in response to data requests received from the common logic interface 76 which, as shown in FIG. 3, is connected to the remote station logic 37 to receive the requests from the remote station for the time correlation of the sequence of events whose status has input to the sequence of events unit by way of the digital input 80. The movement of data to and from the central processing unit memory and to and from the other components of the sequence of events unit of FIG. 3 is over the data bus 82 and is under the control of the CPU. The operation of the sequence of events unit of FIG. 3 and the time tagging of the events whose status is examined by that unit is effected by clock 84 and its interconnections with the data bus, address bus, and the control signal lines.

The point processor control effected by the point processor 72 selects which one of the input points received by the digital input 80 is to be sampled by the point processor logic at any one time. The points are selected in sequence with the sequence continually repeated as, for example, once every 0.5 milliseconds. The status of the point, point number, and time are recorded by the point processor logic. The current or new status is compared with previously recorded status for a point to determine whether the status has remained the same or has changed. When a change in status remains constant for a predetermined period of time, for example 8 milliseconds, the status change is considered valid and is stored in the CPU memory along with the point number and the initial time of change which will be referred to as the event time Tr(E), or time tag. When requested by the remote station as through the common logic 37, the CPU reads the point status information stored in the memory 74. The common logic interface 76 receives one of three types of data requests from the remote station logic 37, and sends the decoded function command on the data bus 82 to the CPU 66. In response the CPU sends the data to the interface 76 on the data bus 82. Under control of the CPU, the interface 76 receives the data over the 8 bit data bus 82 and converts it to a 12 bit format for transmission over the parallel data input bus 62 to the remote station logic 37.

The clock 84 generates the system timing signals and the time signals used to record the time of an event or change in status of a point. The system timing signals supply the system clock for the CPU 66 and the timing signals for the point processor control 72. The signal which starts the new cycle of time, the beginning of each new point processor memory cycle, is also generated by the clock 84 as are the reset signals which restart and set initial conditions for the sequence of events units' components. A time value generated by the clock 84 is read by the CPU 66 from the data bus 82 and a 12 bit segment of the time value is also fed directly to the point processor logic.

Figure 4:
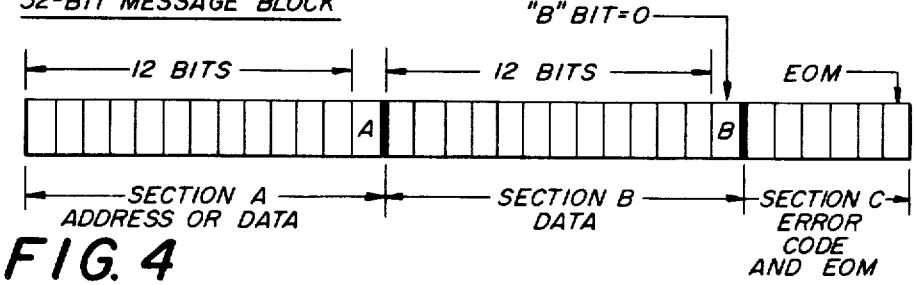
FIG. 4 is a diagram of a message block.

Access to the sequence of events data is obtained through the normal station address of the remote station along with dedicated function and group code combinations assigned to data acquisition by the sequence of events unit. The basic message block is in the format of FIG. 4, namely a 32 bit block consisting of three sections in which Sections A and B which contain 12 information bits and a 13th housekeeping bit called Bit A for Section A, and Bit B for Section B. Bit A is used as a flag to specify whether the preceding 12 bits contain an address or data. Section C contains a 5 bit Bose-Chaudhuri error detecting code and end of message (EOM) bit. Since the EOM bit is not used in generating the 5 bit error code, the message block can be referred to as being 31 bits long. The most significant bit of each section is in the left-most one.

Section A of the first message block transmitted in either direction between master and remote always contains the station address. In the sequence of event unit to remote station transmission, Section A contains the re-encoded control address that the unit received and decoded. This enables the master station to ascertain that the correct unit has responded. The unit via the remote station usually transmits more than one message block to the master station. In the first block, Section A contains the received station address as indicated above; in subsequent blocks, it contains data. To indicate the type of information in Section A for transmitting in either direction, Bit A is a "zero" for address and a "one" for data.

The contents of Section B depend upon the information being requested. In the scan function Section B contains no information in the master-to-remote transmission, it contains scan data in each message block of the remote-to-master reply. Section C contains the five bit error detecting code and the EOM bit. The EOM bit in a given message block is a zero if this block is to be followed by another block in the transmission or it is a "one" if this is the last one to be transmitted.

Figure 5:
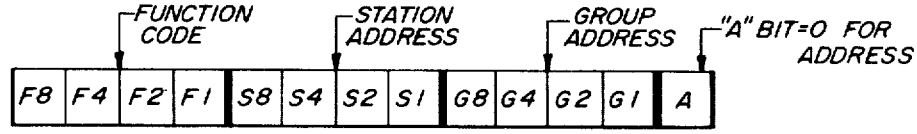
FIG. 5 is a diagram of the address section of a message block.

The address section of the message block (Section A) is divided into three 4-bit fields as shown in FIG. 5. The first field specifies the function to be performed by the remote station addressed by means of the second field. The third field contains the group address. The three types of data request functions to be performed by the sequence of events unit are determined by a combination of the function code and the G8 and G4 bits of the group address. The G2 and G1 bits of the group address determine which of the four possible units connected to the remote station is requested to respond to the data request.

Figure 6:
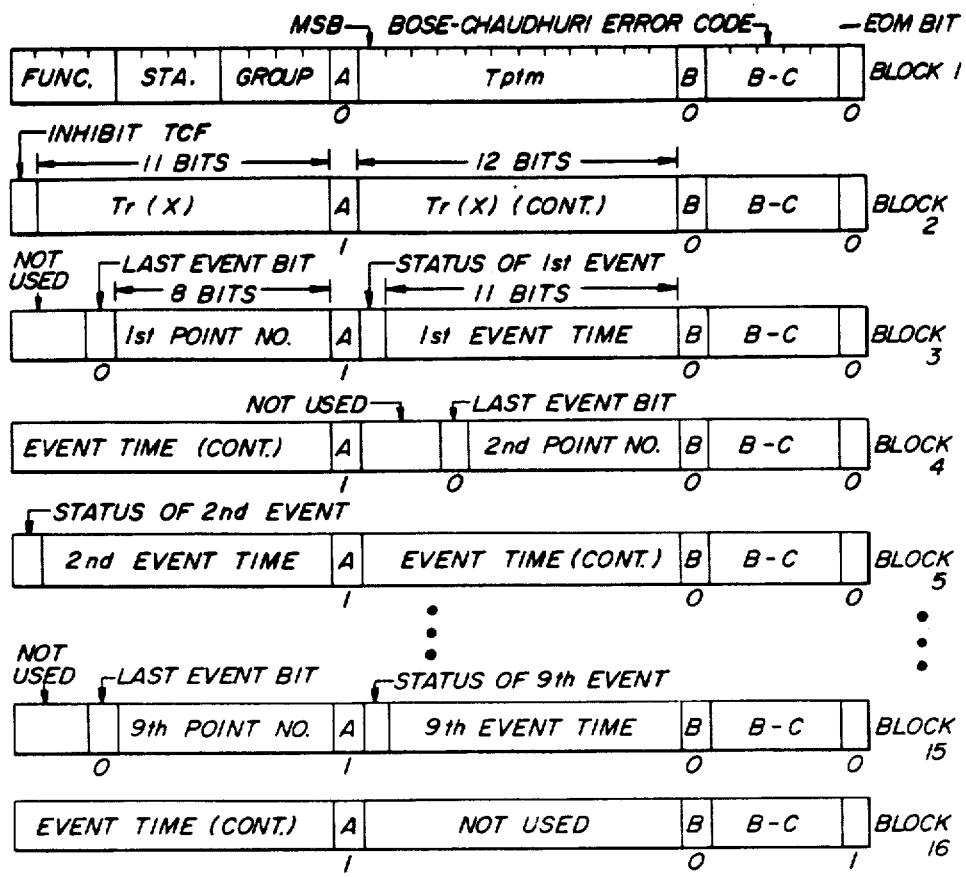
FIG. 6 is a diagram of the 16 block reply message from a SOE unit.

The three types of scan requests which can be addressed to a sequence of events unit include a request asking for all the sequence of events data presently stored in the addressed unit. The request may be for a repeat buffer scan to reaccess the same unit in order to recover data lost due to a communications error. Alternatively, the scan may be a scan status data request which would indicate the present status of various contacts associated with control units of the process being monitored. The 16 block message, as shown in FIG. 6, is used in response to the transmit buffer request shown on the repeat buffer scan. It should be noted that for each event there is reported a last valid event indicator of 1 bit, a point number of 8 bits, a point status of 1 bit, and an event time of 23 bits in straight binary. The 23 bits of time allow a time range of one hour. Data retrieval by the master station of the events to be ordered time-wise by the master clock occurs in seconds after the events are detected. However, the expanded time required by the event time bits allow for loss of communication facilities or down time without the loss of time information or the events to be ordered.

The last valid event indicator is used to signal to the master station that the last event has been transmitted. This signals that the event buffer accessed has been emptied and the remainder of the 16 blocks do not contain event information. If the last valid event bit is not set in the reply, the master station repeats the data request to retrieve the remaining events.

The response to a status data request is in the same format as the normal data and status scan with the first B Section used for internal status information only. One scan address per unit is allocated for the acquisition of status data. Using standard asynchronous communication techniques between the master and remote stations, all of the status points of a unit are packed in the 16 block message.

Retrieval of the sequence of events information is done via a demand scan mechanism. This mechanism is triggered by an alarm status bit indicating an alarm condition. The scanning of the remote station is part of its normal operation of providing power system data to the master station. The alarm status bits are contained in the first B Section of the reply to the scan status data request followed by the implemented number of status points in blocks two and later. Using this technique, the system is only loaded with sequence of events data transmissions when the events have occurred.

In attempting to arrange a time ordered sequence of a group of events, it becomes necessary to determine a time correction factor applicable to time tags assigned to the event by the remote station. This factor corrects the remote station time for its deviation from master time. In the calculation at the master station of a time correction factor (TCF), a data request output to the master station line buffer for a "transmit buffer request" or a "repeat buffer scan request" dictates to the line buffer to transmit a one block data request message and to store at the master station the time of transmission of the end of message bit of that transmitted block Tm(O). As a result of the data request, the remote station replies with a 16 block reply containing the time data for establishing the sequence of events as that time was stored at the addressed unit upon occurrence of the event. In addition to the time information, three remote station variables are transmitted in the reply. They are basically the "request to send" and "clear to send" (turnaround) delay time (TPTM), required after receipt of a request to start transmitting a reply, the addressed unit time value, Tr(X), establishing the time in accordance with the remote station clock when the end of the received message has been received, and the "inhibit TCF correction" control bit. The time values TPTM and Tr(X) are utilized at the master station for correcting the new TCF only if the "inhibit TCF correction" bit is reset. This correction factor then allows the master station to translate various remote station event times into common master station time values for time correlation. The master station records the time Tm(Y) of the receipt of the first message block and continues to receive and process 16 data blocks until the "last valid event" indication is received.

The values of Tm(O), TPTM, Tr(X), Tr(Y), and M (the length of the message), are used to calculate the time correction factor TCF in accordance with the following formula:

$$TCF = \tfrac{1}{2}[Tm(O) + Tm(Y) - TPTM - M] - Tr(X)$$

Of course, TPTM may be considered to be zero for simplification. Likewise, M may be zero when all time measurements are made with relationship to the same bit position in the message structure or when the accuracy required is such that M is small by comparison to the other values in the calculation.

Figure 7:
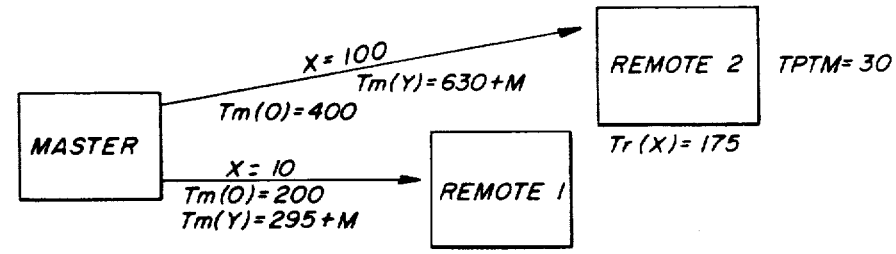
FIG. 7 is a block diagram of a system showing sample calculations of the correction factor.

Examples of the calculations in accordance with the above equation may be seen in FIG. 7 where the master station is shown as having connections to two remote stations with the time units for the various parameters necessary for the calculation of the time correction factor being shown along with the time correction factor calculations.

From FIG. 7 it will be seen that the time for transmission (X) over the communications lines is respectively 10 units and 100 units for remote stations 1 and 2. Thus, if the interrogatory message to remote station 1 is transmitted at 200 (by the master clock), received at remote 1 at 30 (by the remote clock time) then retransmitted in the form of response after a delay of 75 to be received at 295+M (295 by the master clock plus the time corresponding to the length of the message) the correction factor is 180. That amount of time must then be added to the time tags carried by the event information transmitted from remote 1 to the master.

Similarly, the interrogatory message sent by the master at 400 to remote 2 is delayed by 100 units during transmission over the communications lines so that the message arrived at 175 (by the clock at remote 2) after which a delay of 30 occurs before transmission of the reply giving the time tag information on the events at remote 2 which are to be correlated to determine their sequence. The reply message is received by the master at (630+M). The time correction factor applied is thus 325 which must be added to the time tags on the event data received by the master in the reply message.

A major source of error in the time ordering of a sequence of events such as discussed above, where clock differences are corrected, arises due to the relative drifts of the clocks in the remote stations as compared with the clock in the master station. That source of error is really due to the clocks operating at slightly different frequencies and can be eliminated by making a drift compensating calculation on a periodic basis n at the master station. The error referred to is the difference between the master time equivalent for Tr(E), the event time from the remote clock, and the same event time if it were measured at the time when TCF is determined. That calculation would include the calculation of a time correction factor TCF(n) as discussed above for the period n in accordance with the following equation:

$$TCF(n) = \tfrac{1}{2}[Tm(O)(n) + Tm(Y)(n) - TPTM(n) - M] - Tr(X)(n)$$

The master station can then store the factor TCF(n) so it can then be used for calculating the correction factor TCF' which includes a correction for the updated drift of the remote station clock as compared with the master clock in accordance with the following equation:

$$TCF' = TCF(n) - Dr(n)'[Tr(X)(n) - Tr(E)(n)]$$

where
(n−1) is the previous interrogation period,
Tr(E) is the time of the occurrence of the event (by the remote clock) or, in other words, the time tag, and
where DR(n)' the updated drift rate is calculated in accordance with equation $$DR(n)' = DR(n-1)' + W[DR(n) - DR(n-1)]$$

where W is a weighting factor which may be less than 1 if it is desired to lag the calculation for oscillating factors causing drift, such as temperature, and where the drift rate DR(n) is calculated in accordance with the equation $$DR(n) = \frac{TCF(n) - TCF(n-1)}{Tr(X)(n) - Tr(X)(n-1)}$$

The weighting factor W may be 1 if there are no sources of drift which vary randomly and thus require a lagged correction. Thus, if the only source of drift is the different frequencies at which the clocks work, then W is 1 and $DR(n)' = DR(n)$.

What is claimed is:

1. In a digital data acquisition system having a master station connected to a plurality of remote stations from which are gathered information as to the time of occurrence, time tags, of certain events as obtained by reference to unsynchronized clocks at the associated remote stations, a method for correcting the time tags so that they refer to time as kept by a clock at the master station, to make possible a time ordering of events at different remote stations, comprising the steps of:

transmitting at each interrogatory period (n) from said master to said remote stations interrogatory messages requesting information on time tagged events at said remote stations;

storing at said master station a first signal representing the master clock time, Tm(O)(n), when the interrogatory message is sent by the master;

producing at each interrogated remote station a second signal representing the remote clock time, Tr(X)(n), when the message was received at the remote station;

producing at each of said remote stations a third signal which constitutes a reply message incorporating the time tag, Tr(E)(n), for the events information requested, the delay time TPTM(n), and the time Tr(X)(n);

storing at the master station a fourth signal representing the master clock time, Tm(Y), when the end of the reply message is received at the master station;

combining said first, third, and fourth signals at the master to produce a fifth signal representing a time correction factor, TCF(n), for the period (n), for each event, said combination being in accordance with the equation $$TCF(n) = \tfrac{1}{2}[Tm(O)(n) + Tm(Y)(n)] - Tr(X)(n);$$

modifying said fifth signal to produce a sixth signal, TCF', representing the time correction factor with correction for the drift of the clock in the associated remote stations as compaed with the masters clock, said modification being in accordance with the equation $$TCF' = TCF(n) - DR(n)[Tr(X)(n) - Tr(E)(n)]$$

where Tr(E)(n) is the time of occurrence, and Dr(n), the drift rate, is calculated in accordance with the equation $$DR(n) = [TCF(n) - TCF(n-1)]/[Tr(X)(n) - Tr(X)(n-1)];$$

summing for each event said sixth signal and that part of the third signal representing the time tag Tr(E)(n) to produce a seventh signal representing the correct timing of the events with reference to the master clock; and recording said seventh signal for each event to provide a basis for time ordering a sequence of events occuring at different remote stations.

2. In a digital data acquisition system having a master station connected to a plurality of remote stations from which are gathered information as to the time of occurrence, time tags, of certain events as obtained by reference to unsynchronized clocks at the associated remote stations, a method for correcting the time tags so that they refer to time as kept by a clock at the master station, to make possible a time ordering of events at different remote stations, comprising the steps of:

transmitting at each interrogatory period (n) from said master to said remote stations interrogatory messages requesting information on time tagged events at said remote stations;

storing at said master station a first signal representing the master clock time, Tm(O)(n), when the interrogatory message is sent by the master;

producing at each interrogated remote station a second signal representing the remote clock time, Tr(X)(n), when the message was received at the remote station;

producing at each of said remote stations a third signal which constitutes a reply message incorporating the time tag, Tr(E)(n), for the events information requested, the delay time TPTM(n), and the time Tr(X)(n);

storing at the master station a fourth signal representing the master clock time, Tm(Y), when the end of the reply message is received at the master station;

combining said first, third, and fourth signals at the master to produce a fifth signal representing a time correction factor, TCF(n), for the period (n), for each event, said combination being in accordance with the equation $$TCF(n) = \tfrac{1}{2}[Tm(O)(n) + Tm(Y)(n) - TPTM(n) - M] - Tr(X)(n)$$

where M is the length of the message;

modifying said fifth signal to produce a sixth signal, TCF', representing the time correction factor with correction for the drift of the clock in the associated remote as compared with the master clock, said modification being in accordance with the equation $$TCF' = TCF(n) - DR(n)'[Tr(X)(n) - Tr(E)(n)]$$

where Tr(E)(n) is the time of occurrence, and DR(n)', the updated drift rate, is calculated in accordance with the equation $$DR(n)' = DR(n-1)' + W[DR(n) - DR(n-1)]$$

where W is a weighting factor, and DR(n), the drift rate, is calculated in accordance with the equation $$DR(n) = [TCF(n) - TCF(n-1)]/[Tr(X)(n) - Tr(X)(n-1)]$$

summing for each event said sixth signal and that part of the third signal representing the time tag Tr(E)(n) to produce a seventh signal representing the correct timing of the events with reference to the master clock; and recording said seventh signal for each event to provide a basis for time ordering a sequence of events occuring at different remote stations.

* * * * *